(12) United States Patent
Ovchinnikov

(10) Patent No.: US 8,548,068 B2
(45) Date of Patent: Oct. 1, 2013

(54) METHOD FOR TRANSMITTING DISCRETE ELECTRICAL SIGNALS

(76) Inventor: Valery Vasilievich Ovchinnikov, Moscow (RU)

( * ) Notice: Subject to any disclaimer, the term of this patent is extended or adjusted under 35 U.S.C. 154(b) by 195 days.

(21) Appl. No.: 13/062,971

(22) PCT Filed: Feb. 24, 2010

(86) PCT No.: PCT/RU2010/000079
§ 371 (c)(1),
(2), (4) Date: Mar. 9, 2011

(87) PCT Pub. No.: WO2011/105921
PCT Pub. Date: Sep. 1, 2011

(65) Prior Publication Data
US 2012/0033744 A1    Feb. 9, 2012

(51) Int. Cl.
*H04B 3/00* (2006.01)
(52) U.S. Cl.
USPC .......................... 375/257; 375/259; 370/431
(58) Field of Classification Search
USPC ................... 375/257, 259; 370/431
See application file for complete search history.

(56) References Cited

U.S. PATENT DOCUMENTS 5,666,484 A * 9/1997 Orimo et al. ............... 714/18
2002/0150116 A1* 10/2002 Huang ..................... 370/431

OTHER PUBLICATIONS

Maxim DS2409MicroLAN Coupler, Feb. 7, 2003.
Maxim DS2409MicroLAN Coupler, Feb. 7, 2003 (Not Recommended for New Design).
Automatic Identification Data-Book, Dallas Semiconductor, 1995 (DS2401).
Automatic Identification Data-Book, Dallas Semiconductor, 1995 (DS2405) (Not Recommended for New Design).

* cited by examiner

*Primary Examiner* — Zewdu Kassa
(74) *Attorney, Agent, or Firm* — Ladas & Parry LLP

(57) ABSTRACT

The invention relates to methods for transmitting information, and specifically to communication interfaces of electronic devices. The method makes it possible to increase the permissible number of transmitters power-supplied from a communication line, raise the distance and reliability of communication, and obtain better conditions of signal reception from differently located transmitters owing to switching off the current of power supply of transmitters and, accordingly, separating the current of signal transmission from the total current running along the communication line. Each transmitter is provided with its internal secondary power supply charged from the communication line. The voltage of the communication line power supply is decreased prior to signal transmission and restored upon completion of signal transmission.

2 Claims, 2 Drawing Sheets

METHOD FOR TRANSMITTING DISCRETE ELECTRICAL SIGNALS

The present invention relates to methods for transmitting information, and specifically to communication interfaces of electronic devices, in particular, to methods of transmitting discrete electrical signals.

A method is known for transmitting discrete electrical signals via a MicroLAN bus ("Automatic Identification Data-Book", Dallas Semiconductor, 1995; www.Dalsemi.com, also see Maxim "DS2409 MicroLAN Coupler", Feb. 7, 2003). The known method for transmission of discrete electrical signals from a transmitter to a receiver which are located on a two-wire communication line with a voltage supply source, the first pole of the source and the first wire of the communication line being grounded, while the second wire of the communication line is connected to the second pole of the source via a resistor, includes transmission of a logic signal in binary code by the transmitter closing the line with the aid of an electrical switch and the receiver reading the voltage value in the wire relative to ground. Here, the logic zero is usually considered to be a voltage level in the communication line below the first preset threshold, and the logic one—above the second preset threshold. As a rule, 0.8V and 1.2V values corresponding to logic TTL levels are chosen for such thresholds. In addition to the MicroLAN interface, many other known interfaces have been constructed in a similar manner.

The known method makes it possible to interconnect a large number of devices and to provide signal transmission in both directions over two wires, and permits the power supply of devices from the communication line, which reduces the cost of the method.

A disadvantage of the known method for transmitting discrete electrical signals is its low noise immunity. When affected by noise, though its effect is the same for both wires, the result of the effect is different, as different are conditions of propagation of noise in the grounded and non-grounded wires of the communication line, more specifically, different are resistances for flowing of the noise current in each wire from the point of effect to the pole of the power supply, or grounding. As a result, at the point of noise effect, as well as in other sections of the communication line, there emerges a voltage difference, i.e. the noise voltage, which prevents the desired signal from being transmitted appropriately.

The closest to the claimed method, in technical substance and the result achieved, is a method for transmission of electrical signals from transmitters to a receiver, which are connected to a two-wire communication line with a communication line voltage supply source, where the reading signal is determined as a logic zero and one, according to the signal level in the communication line relative to preset thresholds, the receiver is provided with a current sensor installed in the communication line between the communication line voltage supply source and the transmitter nearest thereto, the signal transmission being exercised by the transmitter changing the current in the communication line owing to its output resistance being changed and the current sensor measuring the value of the current, each of the transmitters provided with its internal secondary power supply receiving energy from the communication line (International Publication Number WO 2009/067037, International filing date 12.09.2007).

The known method of transmitting discrete electrical signals makes it possible to maintain communication via a single communication line to a large number of transmitters, provided the transmitters are supplied with power from external sources. A disadvantage of the known method is that it does not allow supplying with power from a communication line of a large number of transmitters, or a transmitter of a high energy demand. Transmitters are generally power-supplied from capacitors charged from the communication line through a gate (diode). This makes it possible to ensure uninterrupted power supply of transmitters even at the moment of a voltage drop in the communication line in the course of transmission of signals.

With a communication line connected to a number of transmitters power-supplied from the communication line, the number of the above transmitters cannot be large as the total current of power supply of the transmitters is limited: this must be much lower than the current related to transmission of a signal generated in the course of transmission by one of the transmitters. It is due to the following causal chain in the course of transmission.

The current running through the current sensors is, with no signals transmitted, equal to the total current of power supply of transmitters. At first sight, it seems that, as a signal is being transmitted, the signal communication current must be added to the current of power supply of transmitters, and the current sensor is to register a variation of current. This could be true, if the resistance of the communication line wires were equal to zero. However, the communication line wires have a finite resistance, and with a current related to signal transmission running, the voltage in the communication line would fall. As a result, other transmitters temporarily stop being power-supplied from the communication line and switch to their secondary (internal, generally capacitor-based) power supply, i.e., during the transmission, the communication line current determined by power supply of transmitters is getting lower along with an increase of the current related to transmission of the signal, while offsetting the same. Meanwhile, the total value of a current running through the current sensor remains unchanged; therefore, the current signal from the transmitter would not come to the receiver. It is not until the current related to signal transmission has exceeded the total current of power supply of transmitters that the voltage in the communication line would fall below its minimum value in the static mode. This would result in switching off power supply to all the transmitters in the communication line, and with the current related to signal trans-mission further increasing, the signal in the current sensor will start rising. Therefore, the current related to signal transmission is compensated with the current of power supply of transmitters, and for data communication to be stable, the current related to signal transmission must be considerably higher than the current of power supply of transmitters. Given that the total current in the communication line must be limited to prevent certain negative wave processes in the communication line, there also arises a limitation for the total current of power supply of transmitters, and hence, for their number. Besides, the value of signal in the current sensor is scattered in a wide range, i.e., it depends on location of a transmitter in the communication line: the nearer the transmitter to the current sensor, the smaller the effect of current compensation, and the larger the desired signal.

Within the present invention, the object is achieved of increasing the permissible number of transmitters power-supplied from a communication line, increasing the length of the communication line and equalizing the values of signals from differently located transmitters in case of a drop in power consumption of the communication line.

The stated object is achieved in that, in a method for transmission of discrete electrical signals from at least one transmitter to a receiver connected to a two-wire communication line with a voltage supply source, where the reading signal is determined as a logic zero and one, according to the signal level in the communication line relative to preset thresholds, the receiver is provided with a current sensor installed in the communication line between the communication line voltage supply source and the transmitter nearest thereto, the signal transmission being exercised by the transmitter changing the current in the communication line owing to its output resistance being changed and the current sensor measuring the value of the current, each of the transmitters provided with its internal secondary power supply receiving energy from the communication line, with voltage of the communication line power supply decreased prior to signal transmission and restored upon completion of signal transmission.

Preferably, the voltage of the communication line power supply is decreased to a value below the minimum value of voltage in the communication line along its length in the static mode, with no signals transmitted (the minimum value of voltage in the communication line is observed at its end the most remote from the communication line power supply). In other words, one may say that the voltage of the communication line power supply is decreased by a value at least as large as the voltage drop along the communication line, with no signals transmitted. Here, the voltage of the communication line power supply is not decreased to zero; instead, it is decreased to a reasonable value sufficient for the transmitter to generate a current signal in the communication line, which the signal receiver current sensor would be able to determine against the background of possible electromagnetic noise and signal losses due to wave processes in the communication line. Once the value of this minimum acceptable signal is determined, it is, according to Ohm's law, multiplied by electric resistance of the communication line section between the communication line power supply and the transmitter the most remote from the above power supply. The obtained value is added to a possible voltage drop on the active part of the transmitter, which depends on its design, the result to correspond to the minimum acceptable value, to which the voltage of the communication line power source may be decreased. With the system parameters appropriately selected, this voltage, as was mentioned above, must not exceed the minimum value of voltage in the communication line along its length in the static mode, with no signals transmitted. Choosing the maximum possible value of voltage out of the obtained range of optimum values would be the best solution.

Preferably, each transmitter comprises a capacitor acting as an internal secondary power supply and connected to the communication line via a diode.

The substance of the invention is explained in graphical materials including the following drawings.

Figure 1:
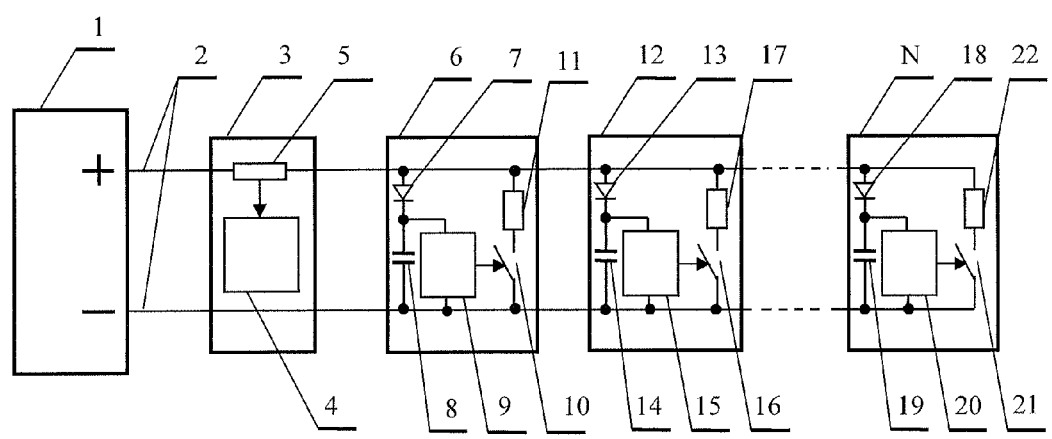
FIG. 1 is a wiring diagram of the preferred embodiment of the communication line, voltage power source, transmitters and a receiver for the method to be implemented.

FIG. 1 discloses the structure of the communication line, which, for the sake of simplicity, only contains three transmitters of the same design; however, owing to application of this invention, the number of transmitters may be considerably increased, e.g., up to 256.

For the substance of the invention to be disclosed, the following conventional designations are introduced in FIG. 1: 1 is power voltage source; 2 is two-wire communication line; 3 is receiver; 4 is receiver microprocessor; 5 is current sensor; 6, 12, ... N are signal transmitters; 7, 13, 18 are diodes of transmitters; 8, 14, 19 are capacitors acting as an internal secondary power supply of transmitters; 9, 15, 20 are microprocessors of transmitters; 10,16,21 are switches of transmitters; 11, 17, 22 are limiting resistors of transmitters.

Figure 2:
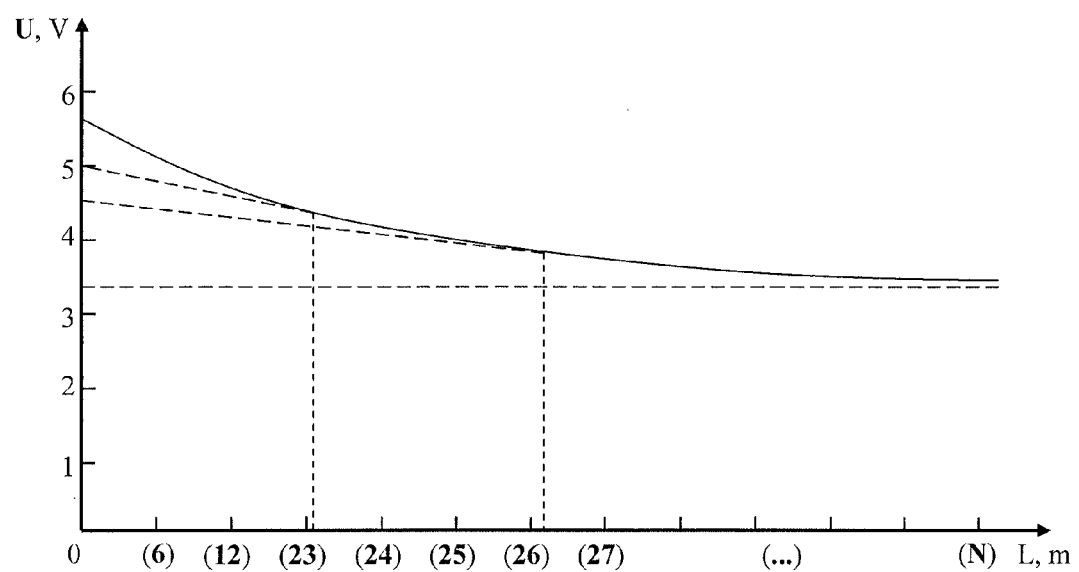
FIG. 2 is a voltage waveform along the length of communication line L from the voltage power source to location of the most remote transmitter N.

In FIG. 2, coordinate "0" corresponds to location of the power voltage source and the current sensor, position N corresponds to location of the transmitter most remote from the power voltage source. Locations (coordinates) of a series of N transmitters are designated as 6, 12, 23, 24, 25, 26, 27, ... N, respectively.

The dashed line in FIG. 2 shows voltage waveforms in the communication line for a brief drop of voltage of power voltage source 1 to the values of 5V, 4.5V and 3.3V. As it follows from FIG. 2, when this happens, transmitters located close to the power supply stop being power-supplied from the communication line: with a drop to 5V, these are transmitters 6, 12 and 23, with a drop to 4.5V, the same plus transmitters 24, 25 and 26, and with a drop to 3.3V, all the transmitters in the communication line.

The substance of the invention lies in the following. With transmitters 6, 12, ... N power-supplied from communication line 2, their power supply current causes a drop of voltage in communication line 2; therefore, the lowest power supply voltage is observed at transmitter N, which is the most remote from power voltage source 1. In this method, the voltage of power supply 1 is briefly (for the time of transmission of electrical signals from transmitters 6, 12, ... N) lowered. Over this period, transmitters, whose power voltage was higher, are switched by diodes 7,13,18 off communication line 2 and switch to being power-supplied from their internal secondary power supplies (capacitors 8,14,19). Here, with a one being transmitted (the switches of transmitters 10,16,21 open), the current in communication line 2 registered by current sensor 5 is determined by consumption of transmitters still power-supplied from the communication line, i.e., those, for which the voltage in the communication line has not decreased (see FIG. 2). In the ultimate case, if the voltage in communication line 2 is decreased below the level of voltage of transmitter N having the lowest power supply voltage (the most remote from power voltage source 1), with a one transmitted, transmitters 6, 12, ... N stop being power-supplied altogether, no current running through current sensor 5.

For a zero to be transmitted from one of the transmitters, e.g., transmitter 12, its microprocessor 15 would close communication line 2 via resistor 17 with switch 16, thus generating the current of transmitting a signal from the transmitter. Here, current sensor 5 will only register the current related to signal transmission, as at the time of signal transmission the voltage in communication line 2 will, under an effect from this current, fall still further, and all the transmitters, which have so far remained power-supplied, will be switched off, as well.

Therefore, current sensor 5 would register the current of signal transmission from transmitter 12 in case of transmission of a zero, whereas in case of transmission of a one, it would register the current of power supply of transmitters still power-supplied from communication line 2. Should the current of signal transmission from transmitter 12 be lower than the current of power supply of transmitters still supplied from communication line 2, as a result of the above-described current compensation, the current running through current sensor 5 will remain unchanged. Should the current of signal transmission from transmitter 12 be higher than the current of power supply of transmitters still supplied from communication line 2, current sensor 5 will register a surge of current equal to an excess of current related to signal transmission over the current of power supply of transmitters still power-supplied from communication line 2. This surge would be generated even if the total current of power supply of all the transmitters in the stationary mode, i.e., before a drop of voltage of power supply 1, were higher than the current related to signal transmission. In other words, owing to application of the invention, the current related to signal transmission can now be registered against the background of a much higher value of the current of power supply of transmitters from the communication line. This was unattainable in a prototype operating in the stationary mode. This enables to raise the current of power supply of transmitters, i.e., to increase the number of these transmitters in communication line 2.

It is also important that the current of transmission of a zero is the same for all transmitters 6, 12, . . . N connected to the communication line, which ensures stable and reproducible communication for all the transmitters connected to communication line 2.

The substance of the method of transmitting discrete electrical signals from a transmitter to a receiver along a two-wire communication line, which ensures communication and power supply from a communication line for a large number of transmitters, is explained by a non-limiting example of its implementation.

EXAMPLE 1

Wires of two-wire communication line 2 are connected to poles of power voltage source 1 with voltage 5.6 V, as shown in FIG. 1. The wires of communication line 2 are connected to receiver 3 and transmitters 6, 12, . . . N, where receiver 3 is installed between transmitters 6, 12, . . . N and power voltage source 1. Here, N may take any values, e.g., 256.

Receiver 3 comprises microprocessor 4 connected to current sensor 5 installed in a wire of communication line 2.

Transmitters 6, 12, . . . N are of identical design comprising microprocessors 9, 15, . . . 20 power-supplied from capacitors 8, 14, . . . 19, respectively, where the capacitors are charged from communication line 2 from diodes 7, 13, . . . 18, respectively. Transmitters 6, 12, . . . N are provided with output stages in the form of switches 10, 16, . . . 21 controlled by microprocessors 9, 15, . . . 20. For a predetermined value of current to be maintained in communication line 2 in the course of transmission of signals, the switches are connected to communication line 2 via limiting resistors 11, 17, . . . 22.

The normal condition of communication line 2 corresponds to transmission of a logical one, where the voltage in communication line 2 is determined by the voltage of power voltage source 1 and a drop of voltage on the wires of communication line 2 related to the current of power supply of transmitters 6, 12, . . . N connected thereto. As a result, the voltage in communication line 2 at the point of installation of the most remote transmitter N is 3.5V.

Prior to initiation of transmission of signals, by closing switch 16, the voltage of power voltage source 1 is lowered to the value of 4.5V, i.e., below the voltage of the power supply (5.6V), but slightly above the minimum voltage in the communication line (3.5V). Here, the transmitters, for which the voltage in communication line 2 has fallen (which are located in communication line 2 closer to power voltage source 1—in FIG. 2, these are transmitters 6, 12, 23, 24, 25 and 26) are switched off power supply from communication line 2: their diodes 7, 13, . . . are closed and stop power-supplying capacitors 8, 14, . . . from communication line 2. Transmitters 6, 12, 23, 24, 25 and 26 switch to being power-supplied from their internal secondary power supplies—capacitors 8, 14, . . . , and the current in communication line 2 falls (this value of current corresponds to transmission of a one). With a logical zero being generated, owing to creation of current in communication line 2, by means of closing switch 16 of one of transmitters 12 via limiting resistor 17, current sensor 5 will register a surge of current equal to a difference between the current of transmission of a zero and the current of transmission of a one (the current of power supply of transmitters still power-supplied).

EXAMPLE 2

The design of communication line 2 and devices connected thereto are totally identical to the one described in example 1.

Prior to initiation of transmission of signals from transmitter 12, by means of closing switch 16, the voltage of power voltage source 1 is lowered to the value of 3.3V, i.e., knowingly below the minimum voltage in the communication line (3.5V). Here, diodes 7, 13, . . . 18 are closed and stop power-supplying capacitors 8, 14, . . . 19 from communication line 2, while transmitters 6, 12, . . . N switch to being power-supplied from their internal secondary sources—capacitors 8, 14, . . . 19, and the current in communication line 2 stops running altogether. After that, transmission of signals is initiated by means of brief generation of a logic zero through creating current in communication line 2 by closing switch 16 of one of transmitters 12 via limiting resistors 17. As a result of a drop of power voltage, current sensor 5 would only register the current generated by switch 16 not disturbed by the current of power supply of transmitters 6, 12, N.

The advantages of the invention are provided due to the fact that, as a result of a brief voltage drop in the communication line, the signal communication current can be separated from the current of power supply of transmitters also running along the communication line, which masks the signal communication current. This makes it possible to lower the total current in the communication line, thus allowing application of a communication line with a higher resistance (in practice, up to 500 Ohm). It means that it becomes possible to increase the length of communication line, and to reduce costs of communication provision: to reduce the cross-section of wires, the storage battery capacity, and the power of the power supply. A decrease of the communication line current load allows operating at a higher current consumed by transmitters, i.e., increasing the permissible number of transmitters power-supplied from the communication line, increasing the distance and reliability of communication, and obtaining better conditions of signal reception owing to equalizing the values of signals from differently located transmitters.

The invention claimed is:
1. A method for transmitting discrete electrical signals from at least one transmitter to a receiver connected to a two-wire communication line with a voltage supply source, where a reading signal is determined as a logic zero and one by a level of signal in the communication line, relative to preset thresholds, where the receiver is provided with a current sensor installed in the communication line between the communication line voltage supply source and the transmitter nearest thereto, the signal transmission being exercised by the transmitter changing the current in the two-wire communication line owing to the transmitter's output resistance being changed and the sensor measuring the value of the current, said method comprising:
providing each of the transmitters with its internal secondary power supply charged from the communication line, with the voltage of the communication line power supply decreased prior to signal transmission and restored upon completion of signal transmission, wherein each transmitter comprises a capacitor acting as an internal secondary power supply and connected to the communication line via a diode.

2. The method of claim 1, further comprising, prior to signal transmission decreasing the voltage of the communication line power supply to a value below the minimum value of voltage in the communication line along its length in the static mode.

* * * * *